United States Patent
Wada et al.

(10) Patent No.: US 7,392,798 B2
(45) Date of Patent: Jul. 1, 2008

(54) MULTIPLE-SPARK IGNITION SYSTEM FOR INTERNAL COMBUSTION ENGINE

(75) Inventors: Jyunichi Wada, Chita-gun (JP); Toru Yoshinaga, Okazaki (JP)

(73) Assignee: Denso Corporation, Kariya, Aichi-pref. (JP)

( * ) Notice: Subject to any disclaimer, the term of this patent is extended or adjusted under 35 U.S.C. 154(b) by 0 days.

(21) Appl. No.: 11/699,078

(22) Filed: Jan. 29, 2007

(65) Prior Publication Data
US 2007/0175461 A1 Aug. 2, 2007

(30) Foreign Application Priority Data
Jan. 31, 2006 (JP) .............................. 2006-021962
Jul. 20, 2006 (JP) .............................. 2006-198667

(51) Int. Cl.
*F02P 3/02* (2006.01)
*F02P 1/00* (2006.01)

(52) U.S. Cl. .................. 123/620; 123/627; 123/637

(58) Field of Classification Search ................. 123/620, 123/627, 618, 652, 655, 637
See application file for complete search history.

(56) References Cited

U.S. PATENT DOCUMENTS

| | | | |
|---|---|---|---|
| 4,502,454 A * | 3/1985 | Hamai et al. ............ | 123/406.65 |
| 6,615,811 B1 * | 9/2003 | Butler, Jr. .................... | 123/606 |
| 6,666,195 B2 | 12/2003 | Vogel et al. | |
| 7,021,286 B2 * | 4/2006 | Yoshino et al. ........ | 123/406.29 |
| 7,121,270 B1 | 10/2006 | Plotnikov | |
| 7,212,909 B2 * | 5/2007 | Yoshino et al. ............. | 701/111 |
| 7,222,606 B2 * | 5/2007 | Yoshino et al. ........ | 123/406.37 |
| 2005/0183697 A1 * | 8/2005 | Yoshino et al. ........ | 123/406.37 |

\* cited by examiner

*Primary Examiner*—John T. Kwon
(74) *Attorney, Agent, or Firm*—Nixon & Vanderhye P.C.

(57) ABSTRACT

An ignition system for an internal combustion engine includes an ignition coil, electric power supply circuit, a switching transistor, engine condition detecting element or unit that detects a signal relating to flow speed of air-fuel-mixture gas in the engine, and ignition control unit that controls the switching transistor to provide multiple ignition sparks in a predetermined ignition period. The ignition control unit controls the switching transistor to maintain each of the ignition sparks according to the signal relating to the flow speed of air-fuel-mixture gas in the engine to maintain sufficient spark energy for igniting the air-fuel-mixture gas.

12 Claims, 8 Drawing Sheets

MULTIPLE-SPARK IGNITION SYSTEM FOR INTERNAL COMBUSTION ENGINE

CROSS REFERENCE TO RELATED APPLICATION

The present application is based on and claims priority from Japanese Patent Applications 2006-21962, filed Jan. 31, 2006, and 2006-198667, filed Jul. 20, 2006, the contents of which are incorporated herein by reference.

BACKGROUND OF THE INVENTION

1. Field of the Invention

The present invention relates to an ignition system for an internal combustion engine, and particularly to a multiple-spark ignition system for igniting the fuel in the engine by multiple electric ignition sparks each ignition timing.

2. Description of the Related Art

P2003-521619A (WO01/055588) discloses a multiple-spark ignition system, in which a switching means is turned on or off according to the amount of the primary current flowing from a battery through the primary coil and the amount of the secondary current (discharging current) flowing through the secondary coil of an ignition coil. In more detail, the switching means turns off to generate multiple ignition sparks at a spark plug when the amount of the primary current increases to a threshold value, and turns on to start charging electric energy in the primary coil when the amount of the secondary current decreases to another threshold value.

However, if the battery voltage fluctuates when the primary coil is charged, the charging time of the primary coil varies. If the charging time increases, a ignition-less period in which the ignition spark is not generated increases, resulting in that the fuel ignition performance gets worse.

SUMMARY OF THE INVENTION

Therefore, an object of the invention is to provide an improved ignition system that can give a good fuel ignition performance even if the battery voltage fluctuate.

Another object of the invention is to provide an ignition system for a lean burn engine that can ignite swirled lean air-fuel mixture gas passing by a spark plug at a high speed.

According to a feature of the invention, an ignition system for an internal combustion engine includes an ignition coil, electric power supply means for supplying primary current to the primary coil of the ignition coil at a prescribed voltage, switching means for switching on and off the primary current at controlled timings to discharge the electric energy from the secondary coil to the spark plug, engine condition detecting means for detecting a signal relating to flow speed of air-fuel-mixture gas in the engine, ignition control means for controlling the switching means to provide multiple ignition sparks in a predetermined ignition period. The above ignition control means controls the switching means to maintain each of the ignition sparks according to the signal relating to the flow speed of air-fuel-mixture gas in the engine.

In the above featured ignition system: the electric power supply means may include a battery and a boosting DC-DC converter; the ignition control means may include an ignition control circuit for controlling the switching means to maintain each of the ignition sparks until the signal relating to flow speed of air-fuel mixture gas becomes a predetermined value.

In this ignition system: the engine condition detecting means may include a resistor connected in series with the secondary coil of the ignition coil and the ignition control circuit controls the switching means to maintain each of the ignition sparks until the amount of the secondary current of the ignition coil detected by the resistor becomes a prescribed amount; or the ignition control circuit may change the prescribed amount according to the signal detected by the engine condition detecting means or the prescribed amount as the predetermined ignition period nears its end.

In the above ignition system, the ignition control circuit may turn on the switching means to charge the ignition coil with electric energy for a prescribed charging time before providing each of the multiple ignition sparks that are generated when the switching means is turned off to discharge the electric energy from the ignition coil. In this ignition system, the ignition control circuit increases the prescribed charging time as engine rotation speed becomes lower.

In the above featured system: the electric power supply means may include a battery, a power supply circuit and a capacitor discharge circuit that stores electric energy supplied from the battery and discharges the electric energy into the ignition coil and the ignition control circuit may control the capacitor discharge circuit to store the electric energy for a prescribed charging time before each of the multiple ignition sparks that are generated when the switching means is turned on to discharge the electric energy from the capacitor discharge circuit into the ignition coil.

In the above ignition system the capacitor discharge circuit may include an energy accumulation coil connected to the battery, a second switching means for switching on and off current supplied to the energy accumulation coil and an energy storing capacitor for storing electric energy of the energy accumulation coil generated by the switching operation of the second switching means.

According to another feature of the invention, an ignition system for an internal combustion engine includes an ignition coil, electric power supply means for supplying primary current to the primary coil of the ignition coil at a prescribed voltage, switching means for switching on and off the primary current at controlled timings to discharge the electric energy from the secondary coil of the ignition coil to the spark plug, a secondary current detecting element for detecting secondary current; an ignition control means for controlling the switching means to provide multiple ignition sparks in a predetermined period at the spark plug. The ignition control means is arranged to control the switching means to maintain each of the ignition sparks until the amount of the secondary current becomes a prescribed amount.

According to another feature of the invention, an ignition system for an internal combustion engine includes an ignition coil, a battery, an electric power supply circuit for supplying current to the primary coil of the ignition coil at a voltage higher than a voltage of the battery, switching means for switching on and off the primary current at multiple controlled timings to charge and discharge the ignition coil with electric energy, a spark plug connected to the secondary coil, a secondary current detecting element for detecting secondary current supplied from the secondary coil to the spark plug, and ignition control means for controlling the switching means to provide multiple ignition sparks in a predetermined period at the spark plug. The ignition control means controls the switching means to maintain each of the ignition sparks until the amount of the secondary current detected by the secondary current detecting element becomes a prescribed amount.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

The invention will be described with reference to the appended drawings.

An ignition system according to the first embodiment of the invention will be described with reference to FIGS. 1-6A and 6B.

Figure 1:
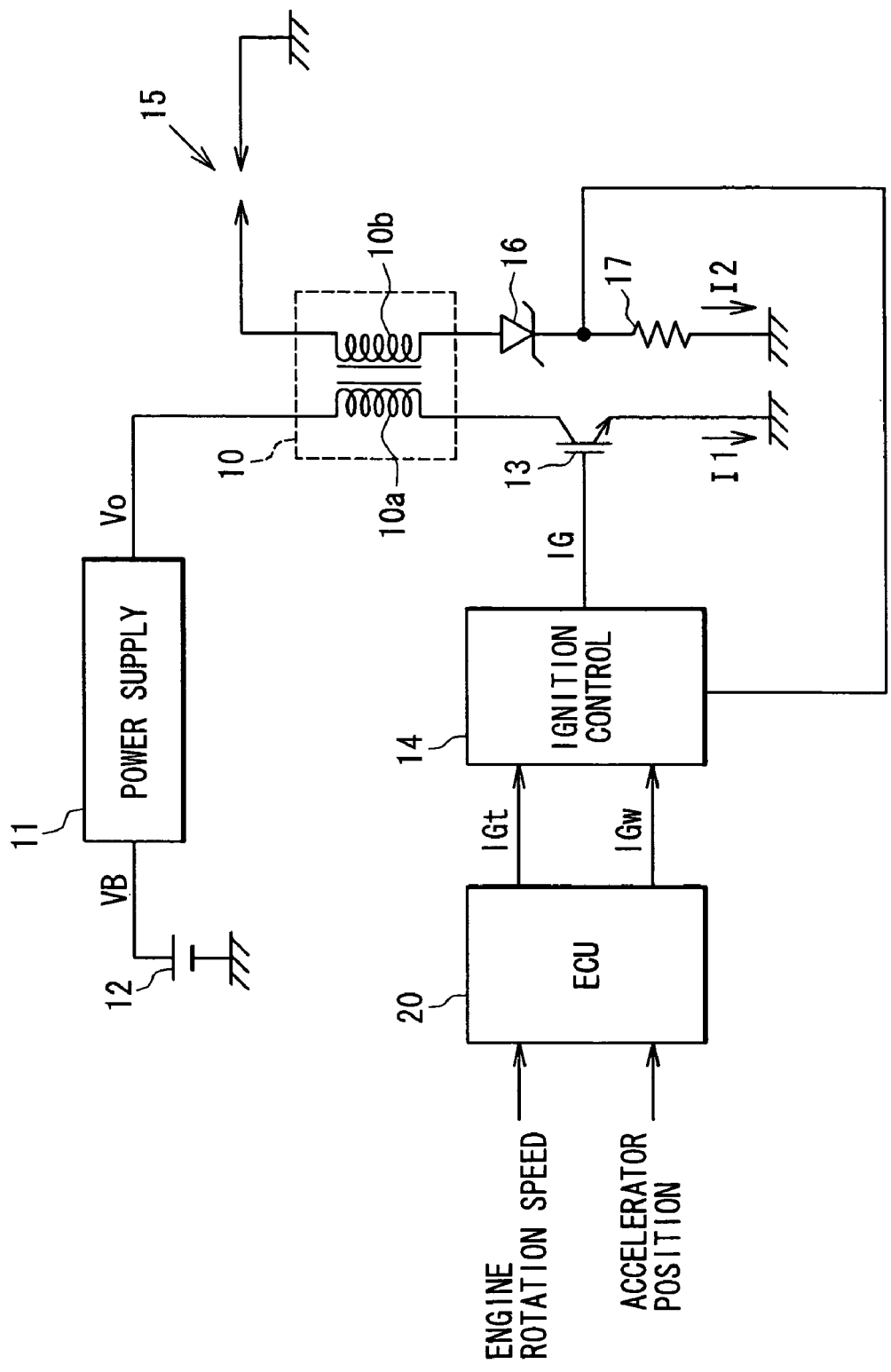
FIG. 1 is a schematic circuit diagram illustrating an ignition system according to the first embodiment of the invention.

As shown in FIG. 1, the ignition system includes an ignition coil 10, a power supply circuit 11, a battery 12, an insulated gate bipolar transistor (hereinafter referred to as the IGBT) 13, an ignition control circuit 14, a spark plug 15, a zener diode 16, a current measuring resistor 17, an ECU 20, etc.

The ignition coil 10 has a primary coil 10a and a secondary coil 10b. The primary coil 10a has a pair of ends, one of which connected via the power supply circuit 11 to a high side (e.g. 12 V) terminal of the battery 12 and the other of which is connected to a ground via the IGBT 13.

The IGBT 13 has a gate connected to the ignition control circuit 14, which controls the switching operation of the IGBT 13. The power supply circuit 11 is constituted of a common boosting DC-DC converter that includes an inductor, a switching element and a capacitor to provide a voltage to be applied to the primary coil 10a. The secondary coil 10b has a pair of ends, one of which is connected to the spark plug 15 and the other of which is connected to the ground via the zener diode 16 and the current measuring resistor 17. The voltage signal of the current measuring resistor 17 is inputted to the ignition control circuit 14.

The ECU 20 includes a microcomputer constituted of a CPU, a RAM, a ROM, etc. and executes various control programs that are stored in the ROM to control an internal combustion engine. The ECU 20 inputs engine operation data such as an engine rotation speed and an accelerator position and calculate a suitable ignition timing and ignition period in which multiple sparks are generated based on the data to output an ignition timing signal IGt and ignition period signal IGw to the ignition control circuit 14.

The ignition control circuit 14 provides a drive signal IG to control the switching operation of the IGBT 13 according to the ignition timing signal IGt and the ignition period signal IGw.

In more detail, the ignition control circuit 14 turns off the IGBT 13 according to the ignition timing signal Igt to generate the first ignition spark at the ignition timing. Thereafter, the ignition control circuit 14 turns on and off the IGBT 13 repeatedly to generate multiple ignition sparks at the spark plug 15.

Figure 2:
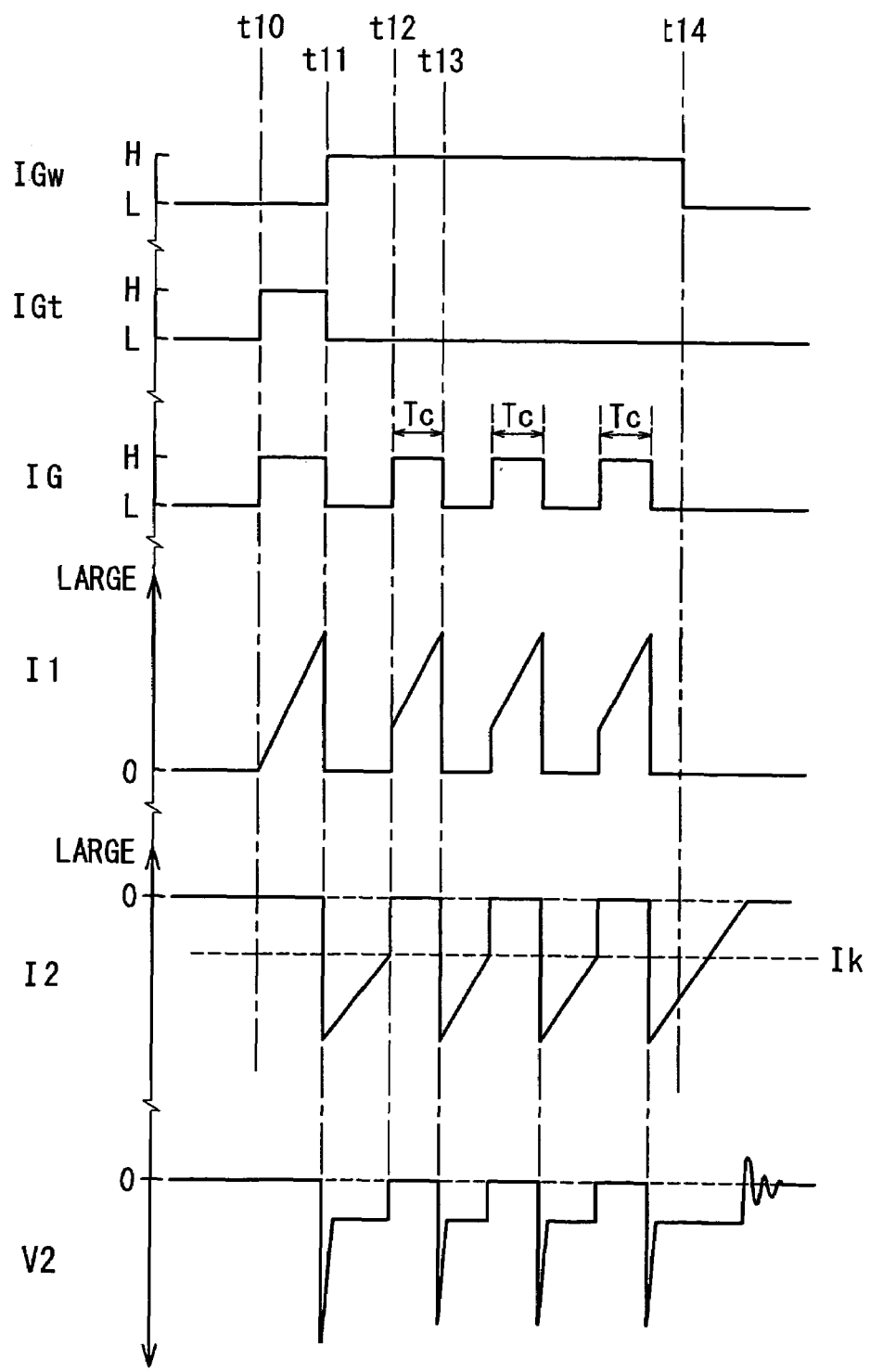
FIG. 2 is a time diagram showing operation of main portions of the ignition system.

As shown in FIG. 2, the first ignition spark (secondary voltage V2) is generated at timing t11, and the multiple ignition sparks are generated in the period between timing t11 and t14, in which the IGBT 13 is cyclically turned on and off. At a timing t10 before the first spark timing t11, the level of the ignition timing signal IGt becomes high (H). Consequently, the level of the drive signal IG becomes H to turn on the IGBT 13. Accordingly, primary current I1 flows in the primary coil 10a to charge electric energy into the ignition coil 10. When the level of the ignition timing signal IGt becomes low (L) at the spark timing t11, the level of the drive signal IG becomes L to turn off the IGBT 13. As a result, the first ignition voltage V2 is generated by the secondary coil 10b to cause the first ignition spark at the spark plug 15, so that the secondary current I2 flows across the spark plug 15.

The multiple-spark signal IGw is also rises up to the H level at the spark timing t11. Therefore, the drive signal IG rises up to the H level at timing t12 to turn on the IGBT 13 for a period Tc until timing t13 to make the primary current flow in the primary coil 10a, thereby charging the ignition coil 10 with a sufficient electric energy. Subsequently, the drive signal falls down to the L-level to turn off the IGBT 13 again, thereby discharging the electric energy to generate ignition spark again. Thereafter, the drive signal IG repeatedly changes its level to turn on and off the IGBT 13 to generate multiple sparks at the spark plug 15 until the level of the multiple-spark signal IGw becomes L at timing t14.

Figure 3A:
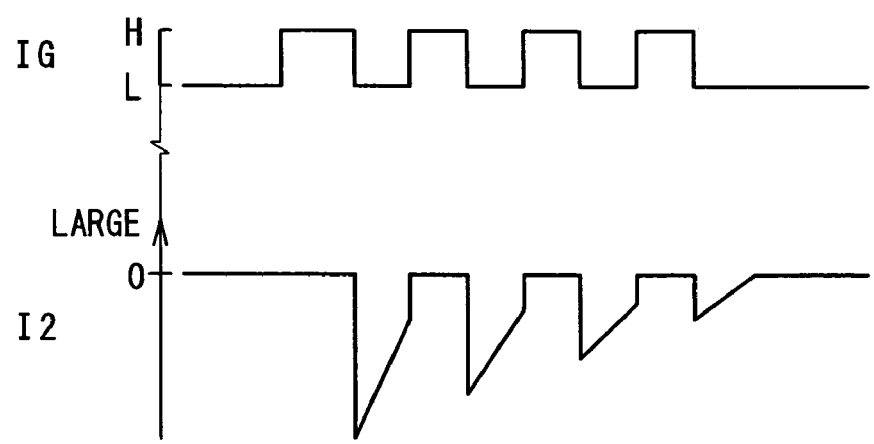
FIG. 3A is a time diagram showing a relation between a drive signal and secondary current of an ignition coil of the ignition system.
Figure 3B:
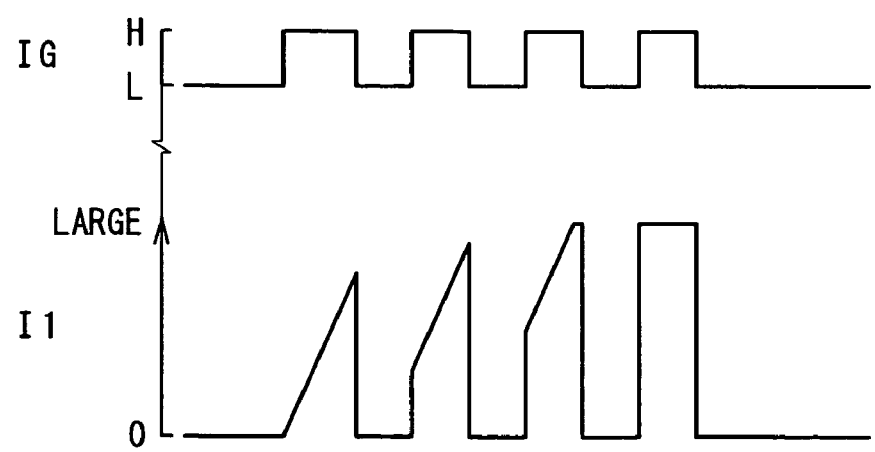
FIG. 3B is a time diagram showing a relation between a drive signal and primary current of the ignition coil.

Incidentally, the electric energy necessary for generating ignition spark at the spark plug 15 changes as the flow speed of air-fuel-mixture-gas in the engine cylinder changes. If the flow speed of the air-fuel-mixture-gas becomes higher, the amount of the secondary current decreases as the on-off operation of the IGBT 13 is repeated, as shown in FIG. 3A. On the other hand, the amount of the secondary current increases as the on-off operation of the IGBT 13 is repeated, as shown in FIG. 3B.

Figure 4:
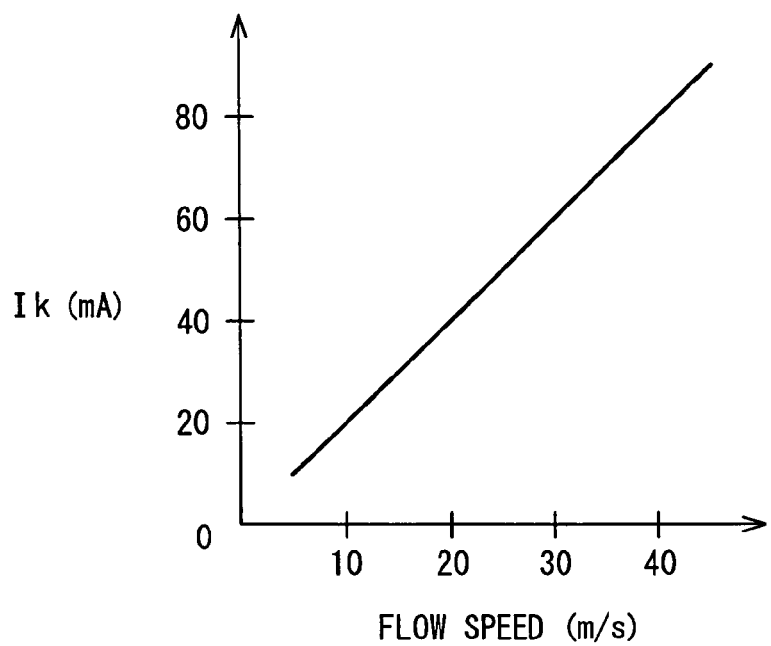
FIG. 4 is a graph showing a relation between the flow rate of fuel gas and the amount of spark keeping current.
Figure 5:
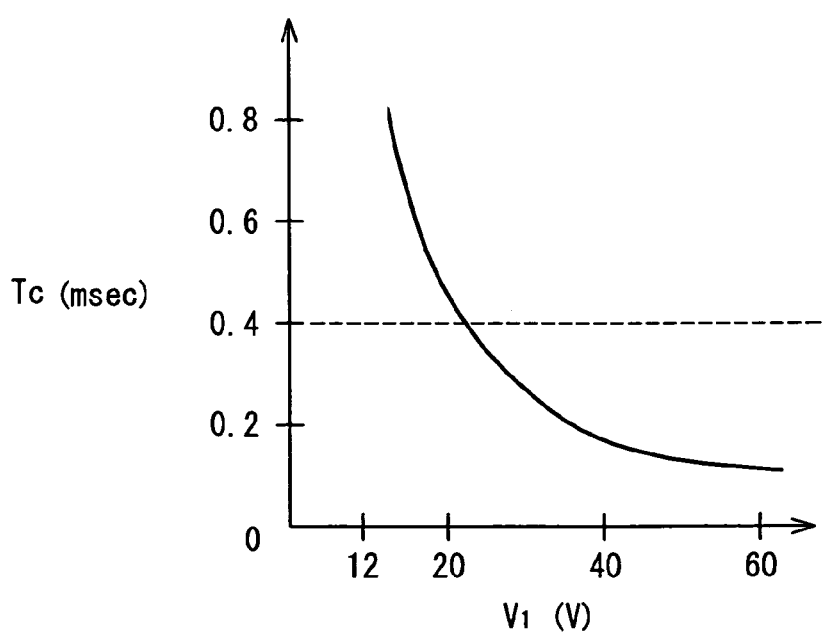
FIG. 5 is a graph showing a relation between voltage applied to the primary coil of an ignition coil and energy-charging time of the ignition coil.

The inventor has noticed that the amount of the secondary current (hereinafter referred to as the spark maintenance current) Ik that is necessary to maintain stable ignition sparks increases as the flow speed of the air-fuel mixture gas increases, as shown in FIG. 4. Further, the period in which a certain amount of electric energy is charged into the ignition coil becomes shorter as the input voltage applied to the primary coil 10a increases, as shown in FIG. 5. Therefore, it is effective to provide the primary coil 10a with a suitable amount of primary current in the charging time Tc (e.g. 0.4 m sec) that the input voltage V1 is controlled according to the amount of the secondary current.

Thus, the ignition control circuit 14 is arranged to make the level of the drive signal IG high to turn on IGBT 13 to supply the primary current I1 when the amount of the secondary current (or spark current) becomes as large as a threshold value (hereinafter referred to as the maintenance current value) Ik, which provide secondary voltage for causing multiple ignition sparks, as shown in FIG. 2. At the same time, the power supply circuit 11 is arranged to provide supply voltage of a level Vo that is sufficient to provide the primary current 11 for charging the primary coil with the electric energy in the charging time Tc even if the battery voltage lowers to a minimum level (e.g. 12 V). Incidentally, the,.supply voltage Vo can be controlled to provide a suitable electric energy by the ignition control circuit 14 according to the amount of the secondary current that is measured by the current measuring resistor 17.

Figure 6A:
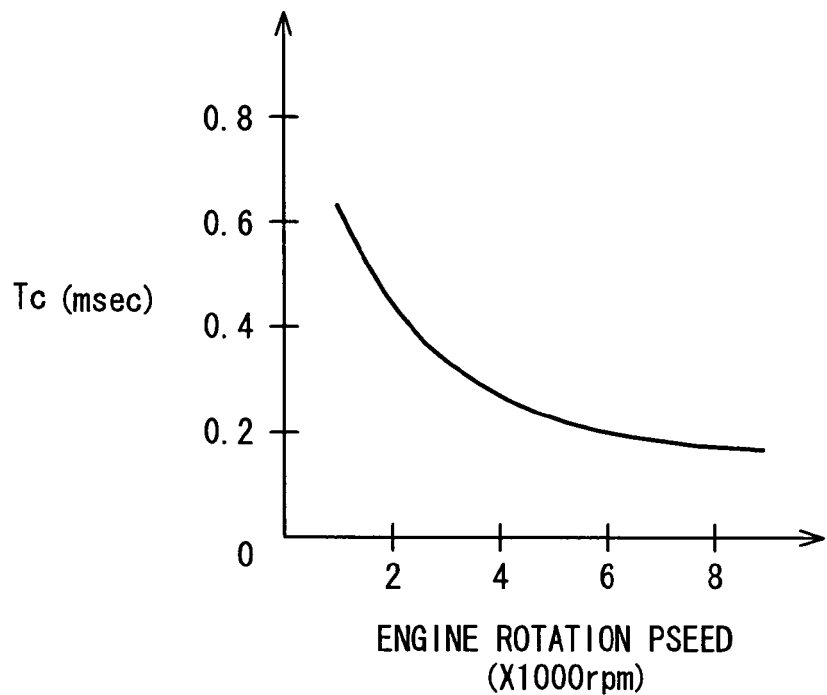
FIG. 6A is a graph showing a relation between engine rotation speed and energy charging time.
Figure 6B:
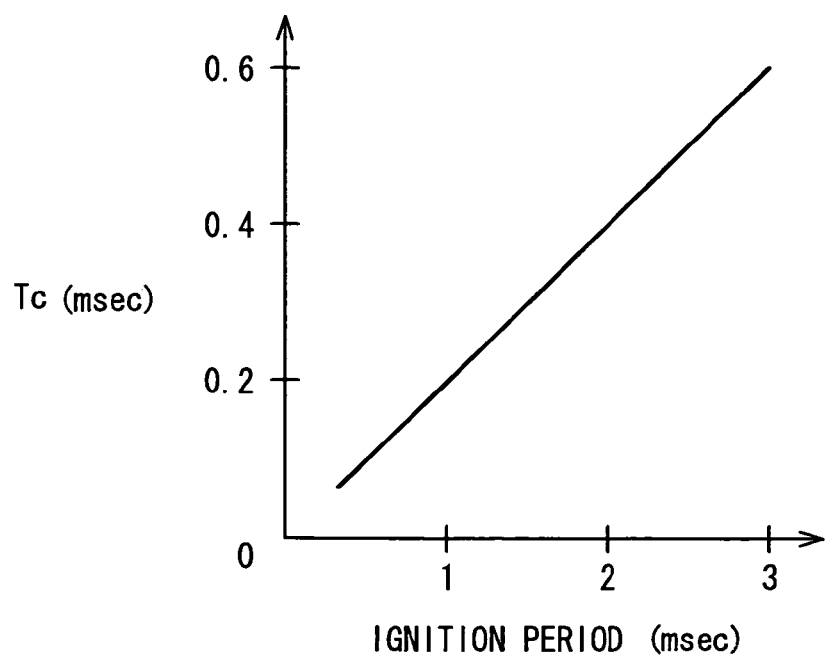
FIG. 6B is a graph showing a relation between an ignition period in which multiple sparks are generated and the energy charging time.

In the ignition system according to the first embodiment of the invention, the charging time may be changed according to the engine rotation speed. As shown in FIG. 6A, the suitable charging time Tc decreases as the engine rotation speed increases. As shown in FIG. 6B, available time for charging the ignition coil 10 increases as the ignition period increases.

The ignition control circuit 14 may provide a charging time control means (or program) for increasing the charging time Tc as the engine rotation speed decreases. This embodiment is effective to reduce working loads of the power supply circuit 11, the battery 12, the IGBT 13, the spark plug 15, etc.

The current measuring resistor 17 may be replaced by some other means that measures a value representing the flow speed of air-fuel-mixture-gas in the engine cylinder, such as the engine rotation speed, the cylinder charging efficiency.

An ignition system according to the second embodiment of the invention will be described with reference to FIGS. 7 and 8.

Incidentally, the same reference numeral as the first embodiment represents the same or substantially the same portion, part or component as the first embodiment, hereafter.

Figure 7:
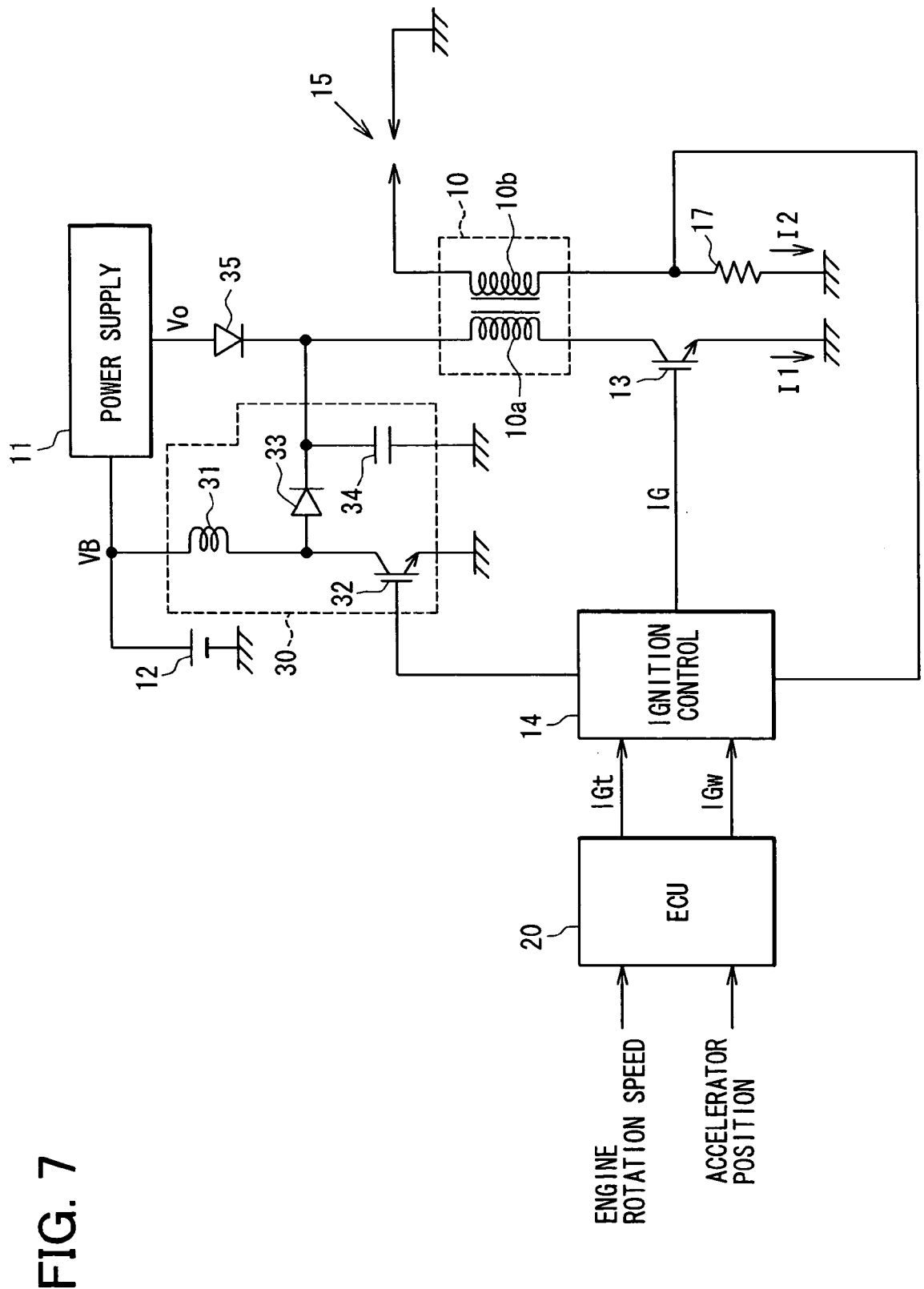
FIG. 7 is a schematic circuit diagram illustrating an ignition system according to the second embodiment of the invention.

As shown in FIG. 7, the ignition system includes a capacitor-discharge circuit (hereinafter referred to as the CD circuit) 30 in addition to the ignition coil 10, power supply circuit 11, battery 12, the IGBT 13, the ignition control circuit 14, the spark plug 15, the current measuring resistor 17 and the an ECU 20. The zener diode 16 that is connected in series with the current measuring resistor 17 is replaced by a backflow prevention diode 35 that is connected in series with the primary coil 10 and the IGBT 13. It may be considered that the CD circuit 30 is included in the power supply circuit 11.

The CD circuit 30 includes a series circuit of an energy accumulation coil 31 and a second IGBT 32, a diode 33 and, an energy accumulation capacitor 34. The first series circuit is connected between the battery 12 and the ground. The diode 33 has the anode connected with the series circuit between the coil 33 and the IGBT 32 and the cathode connected with the end of the primary coil 10a that is connected to the power supply circuit 11 through the backflow prevention diode 35.

When the ignition control circuit 14 provides the gate of the second IGBT 32 with a second drive signal DS, the IGBT 32 turns on to charge the energy accumulation coil 31 with an amount of electric energy. In more detail, the ignition control circuit 14 turns on the IGBT 32 according to the second drive signal Ds to introduce current into the energy accumulation coil 31. Thereafter, the ignition control circuit 14 turns off the IGBT 32 to discharge the electric energy accumulated by the coil 31 to the energy accumulation capacitor 34, which also stores the electric energy. The diode 35 prevents back flow of the current from the capacitor 34 to the power supply circuit 11.

Figure 8:
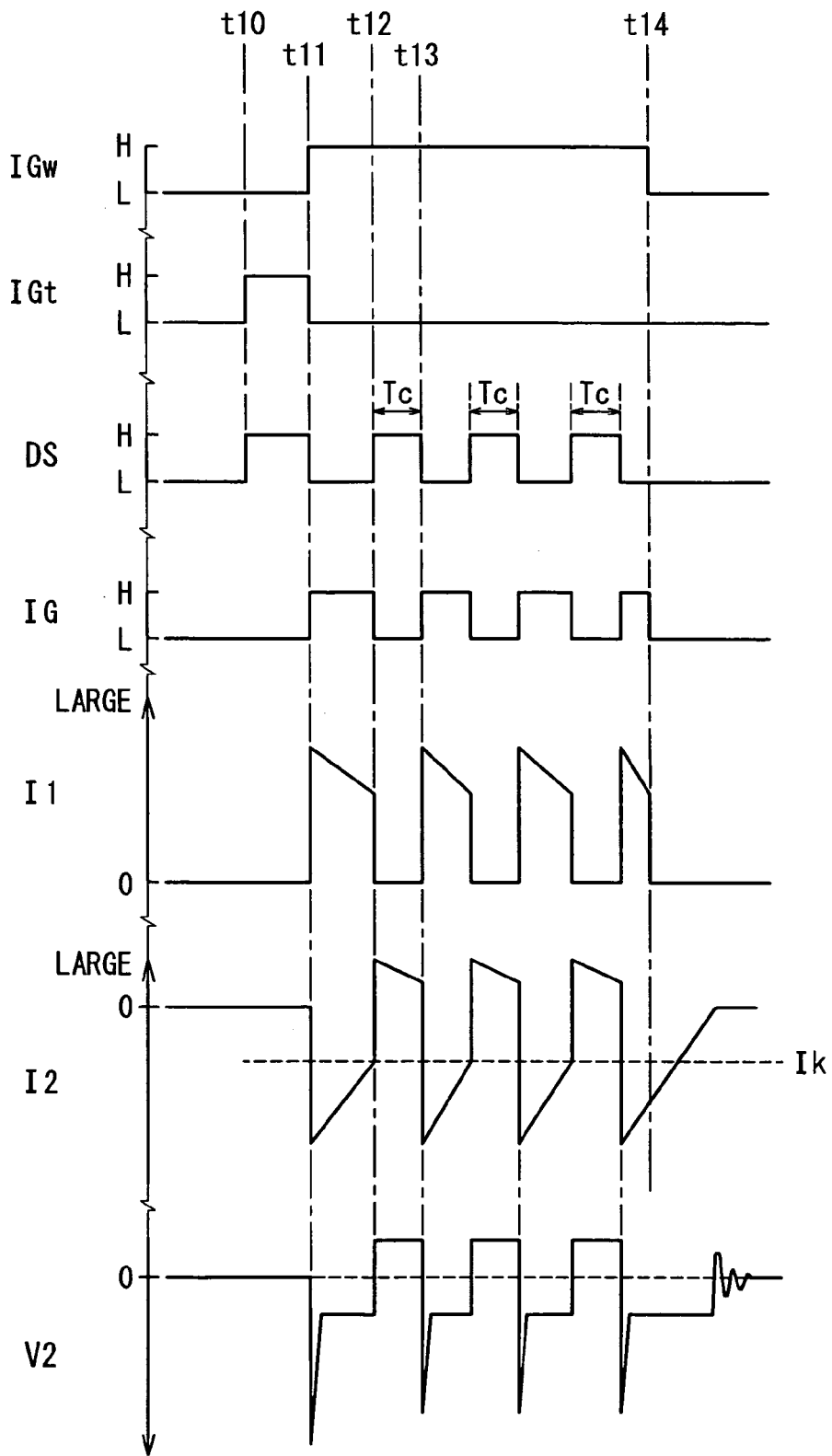
FIG. 8 is a time diagram showing operation of main portions of the ignition system according to the second embodiment.

As shown in FIG. 8, the first ignition spark is generated at timing t11, and the multiple ignition sparks are generated in the period between timing t11 and t14, in which the main IGBT 13 and the second IGBT 32 are,cyclically turned on and off. Incidentally, the second IGBT 32 turns off to discharge the energy accumulation coil 31 when the main IGBT 13 turns on to provide an ignition spark.

At a timing t10 before the first spark timing t11, the level of the ignition timing signal IGt to make the second drive signal DS high (H) so that the second IGBT 32 can turn on to charge the energy accumulation coil 31. Subsequently, at the spark timing t11, the level of the main drive signal IG becomes H to turn on the IGBT 13, while the level of the second drive signal Ds becomes L to turn off the second IGBT 32. Accordingly, electric energy of the capacitor 34 is discharged into the ignition coil 10 to generate the first ignition voltage V2 to cause the first ignition spark at the spark plug 15. That is, the secondary current I2 flows across the spark plug 15, while the energy accumulation coil 31 is charged.

The ignition control circuit 14 is arranged to make the level of the second drive signal Ds high to turn on the second IGBT 32 and the level of the main drive signal IG low to turn off the main IGBT 13 at timing t12 where the amount of the secondary current (or spark current) decreases and becomes as large as the maintenance current value Ik. As a result, the energy accumulation coil 31 is charged again with an amount of electric energy that is sufficient to generate the ignition spark. The ignition control circuit 14 repeats the above control operation to generate multiple sparks at the spark plug 15 until the level of the multiple-spark signal IGw becomes L at timing t14.

The power supply circuit 11 is also arranged to provide supply voltage of a level Vo sufficient to provide the current for charging the energy accumulation coil 31 with the electric energy in the charging time Tc even if the battery voltage lowers to a minimum level.

The supply voltage Vo can be controlled to provide a suitable electric energy by the ignition control circuit 14 according to the amount of the secondary current that is measured by the current measuring resistor 17.

Figure 9A:
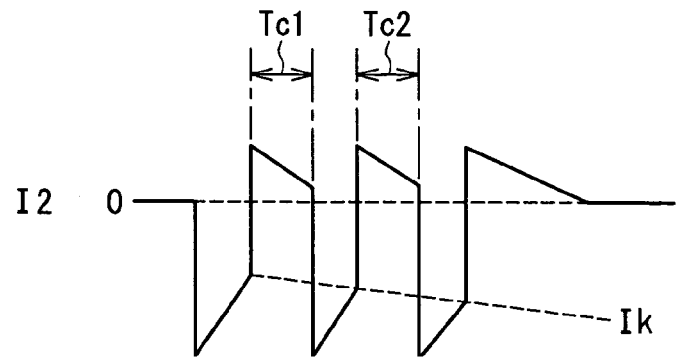
FIGS. 9A, 9B and 9C are graphs showing waveforms of secondary current of other modified ignition systems.
Figure 9B:
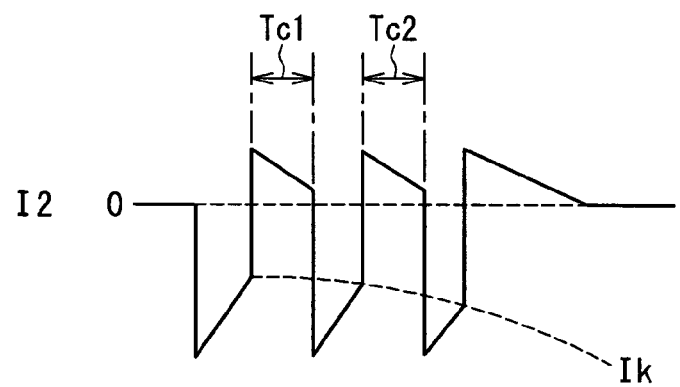
Figure 9C:
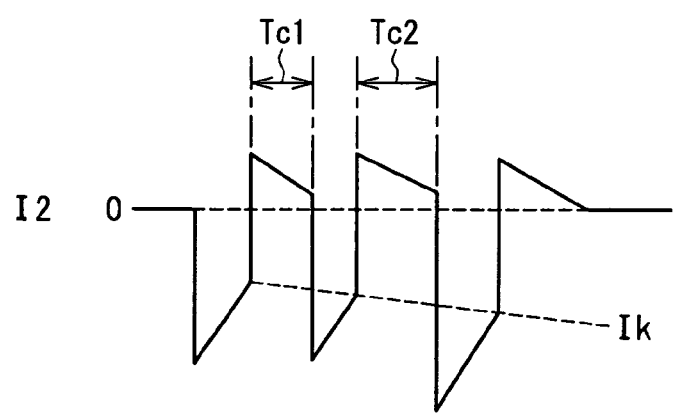

As shown in FIGS. 9A and 9B, the ignition control circuit 14 can linearly or non-linearly increase the level (absolute value) of the maintenance current Ik as the multiple-ignition sparks are continued. This is to increase the electric energy that is discharged into the primary coil 10a of the ignition coil 10 as the engine piston gets close to the upper dead center, at which the flow speed of the air-fuel-mixture gas in the engine cylinder is maximum. The ignition control circuit 14 can also increase the charging time Tc in addition to the level of the maintenance current Ik as shown in FIG. 9C.

The level of the maintenance current Ik may be controlled according to the flow speed of the air-fuel-mixture gas by taking the relation between the maintenance current and the flow speed of the air-fuel-mixture gas shown in FIG. 4 into account.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. An ignition system for an internal combustion engine having a spark plug connected to the secondary coil, the ignition system comprising:

an ignition coil having a primary coil and a secondary coil;
electric power supply means for supplying primary current to the primary coil at a prescribed voltage;
switching means for switching on and off the primary current at controlled timings to discharge the electric energy from the secondary coil to the spark plug;
engine condition detecting means for detecting a signal relating to flow speed of air-fuel-mixture gas in the engine;
ignition control means for controlling the switching means to provide multiple ignition sparks in a predetermined ignition period at the spark plug;
wherein the ignition control means controls the switching means to maintain each of the ignition sparks according to the signal relating to the flow speed of air-fuel-mixture gas in the engine.

2. An ignition system as in claim 1, wherein the electric power supply means comprises a battery and a boosting DC-DC converter.

3. An ignition system as in claim 1, wherein the ignition control means comprises an ignition control circuit, connected to the switching means and the engine condition detecting means, for controlling the switching means to maintain each of the ignition sparks until the signal relating to flow speed of air-fuel mixture gas becomes a predetermined value (Ik).

4. An ignition system as in claim 3, wherein the engine condition detecting means comprises a resistor connected in series with the secondary coil; and
the ignition control circuit controls the switching means to maintain each of the ignition sparks until the amount of the secondary current detected by the resistor becomes a prescribed amount.

5. An ignition system as in claim 3, wherein the ignition control circuit changes the prescribed amount according to the signal detected by the engine condition detecting means.

6. An ignition system as in claim 4, wherein the ignition control circuit turns on the switching means to charge the ignition coil with electric energy for a prescribed charging time before providing each of the multiple ignition sparks that are generated when the switching means is turned off to discharge the electric energy from the ignition coil.

7. An ignition system as in claim 6, wherein the ignition control circuit increases the prescribed charging time as engine rotation speed becomes lower.

8. An ignition system as in claim 3, wherein the ignition control circuit changes the prescribed amount as the predetermined ignition period nears its end.

9. An ignition system as in claim 4, wherein:
the electric power supply means comprises a battery, a power supply circuit 11 and a capacitor discharge circuit that stores electric energy supplied from the battery and discharges the electric energy into the ignition coil;
the ignition control circuit controls the capacitor discharge circuit to store the electric energy for a prescribed charging time before each of the multiple ignition sparks that are generated when the switching means is turned on to discharge the electric energy from the capacitor discharge circuit into the ignition coil.

10. An ignition system as in claim 9, wherein the capacitor discharge circuit comprises an energy accumulation coil connected to the battery, a second switching means for switching on and off current supplied to the energy accumulation coil and an energy storing capacitor for storing electric energy of the energy accumulation coil generated by the switching operation of the second switching means.

11. An ignition system for an internal combustion engine having a spark plug connected to the secondary coil, the ignition system comprising:
an ignition coil having a primary coil and a secondary coil;
electric power supply means, for supplying primary current to the primary coil at a prescribed voltage;
switching means for switching on and off the primary current at controlled timings to discharge the electric energy from the secondary coil to the spark plug;
a secondary current detecting element for detecting secondary current;
ignition control means for controlling the switching means to provide multiple ignition sparks in a predetermined period at the spark plug;
wherein the ignition control means controls the switching means to maintain each of the ignition sparks until the amount of the secondary current detected by the secondary current detecting element becomes a prescribed amount.

12. An ignition system for an internal combustion engine comprising:
an ignition coil having a primary coil and a secondary coil;
a battery;
an electric power supply circuit, connected to the battery, for supplying primary current to the primary coil at a voltage higher than a voltage of the battery;
switching means for switching on and off the primary current at controlled timings to charge and discharge the ignition coil with electric energy;
a spark plug connected to the secondary coil;
a secondary current detecting element for detecting secondary current supplied from the secondary coil to the spark plug;
ignition control means for controlling the switching means to provide multiple ignition sparks in a predetermined period at the spark plug, thereby igniting fuel gas;
wherein the ignition control means controls the switching means to maintain each of the ignition sparks until the amount of the secondary current detected by the secondary current detecting element becomes a prescribed amount.

* * * * *